United States Patent
Lages et al.

(10) Patent No.: US 7,570,793 B2
(45) Date of Patent: Aug. 4, 2009

(54) CORRECTION METHOD FOR DATA OF A PLURALITY OF OPTOELECTRONIC SENSORS

(75) Inventors: Ulrich Lages, Hamburg (DE); Volker Willhoeft, Hamburg (DE); Martin Dittmer, Hamburg (DE)

(73) Assignee: IBEO Automobile Sensor GmbH, Hamburg (DE)

( * ) Notice: Subject to any disclaimer, the term of this patent is extended or adjusted under 35 U.S.C. 154(b) by 738 days.

(21) Appl. No.: 10/480,507

(22) PCT Filed: Jun. 14, 2002

(86) PCT No.: PCT/EP02/06594

§ 371 (c)(1),
(2), (4) Date: Sep. 7, 2004

(87) PCT Pub. No.: WO03/001241

PCT Pub. Date: Jan. 3, 2003

(65) Prior Publication Data

US 2005/0034036 A1  Feb. 10, 2005

(30) Foreign Application Priority Data

Jun. 15, 2001  (DE) .............................. 101 28 954
Jul. 4, 2001    (DE) .............................. 101 32 335
Sep. 28, 2001  (DE) .............................. 101 48 062
Nov. 8, 2001   (DE) .............................. 101 54 861

(51) Int. Cl.
*G06K 9/00* (2006.01)

(52) U.S. Cl. ...................... 382/141; 382/103; 382/216; 342/22; 250/221; 701/96; 714/100

(58) Field of Classification Search ............... 382/141, 382/216; 342/22; 250/221; 180/169; 701/99
See application file for complete search history.

(56) References Cited

U.S. PATENT DOCUMENTS 4,519,469 A * 5/1985 Hayashi et al. ............. 180/169

(Continued)

FOREIGN PATENT DOCUMENTS

DE  2021566  11/1971

(Continued)

OTHER PUBLICATIONS

New Sensor for 360° Vehicle Surveillance.-Innovative Approach to Stop & Go, Lane Assistance and Pedestrian Recognition Proceedings of IV 2001, IEEE Intelligence Vehicle Symposium, May 2001, pp. 1-5, Tokyo, Japan.

(Continued)

*Primary Examiner*—Brian Q Le
*Assistant Examiner*—Aklilu K Woldemariam
(74) *Attorney, Agent, or Firm*—Harness, Dickey & Pierce, P.L.C.

(57) ABSTRACT

The invention relates to a method for providing corrected data in order to generate a model of a monitoring area which is located in the respective visual range of at least two optoelectronic sensors for determining the position of detected objects, based on the amounts of raw data elements corresponding to object points in said monitoring area, said amounts of raw data elements being respectively detected by one of the sensors when the visual range is sensed and associated therewith, and the amounts of raw data elements from various sensors which are temporally linked to each other forming a group. The raw data elements corresponding to said amounts respectively comprise at least the coordinates of object points detected by the associated sensor in relation to the position of the detecting sensor. In order to form corrected amounts of corrected data elements corresponding to the amounts of raw data elements of a group for each group quantity, the coordinates contained in the raw data elements are transformed into a common coordinate system, taking into account the relative position of the respective sensors.

20 Claims, 4 Drawing Sheets

U.S. PATENT DOCUMENTS

| | | | |
|---|---|---|---|
| 5,189,619 A * | 2/1993 | Adachi et al. ................ 701/96 |
| 5,275,354 A | 1/1994 | Minor et al. |
| 5,510,990 A | 4/1996 | Hibino |
| 5,635,922 A | 6/1997 | Cho et al. |
| 5,675,404 A | 10/1997 | Nakazawa et al. |
| 5,717,401 A | 2/1998 | Sabet-Peyman et al. |
| 5,756,981 A * | 5/1998 | Roustaei et al. ........ 235/462.42 |
| 5,808,728 A * | 9/1998 | Uehara ..................... 356/5.01 |
| 5,831,717 A | 11/1998 | Ikebuchi |
| 5,966,090 A * | 10/1999 | McEwan .................... 342/27 |
| 5,966,678 A | 10/1999 | Lam |
| 6,055,490 A | 4/2000 | Dunne |
| 6,100,517 A | 8/2000 | Yahav |
| 6,175,652 B1 * | 1/2001 | Jacobson et al. ............ 382/216 |
| 6,212,480 B1 | 4/2001 | Dunne |
| 6,573,855 B1 * | 6/2003 | Hayakawa et al. ............ 342/22 |
| 6,662,649 B1 * | 12/2003 | Knight et al. ............. 73/290 V |
| 2003/0075675 A1 * | 4/2003 | Braune et al. ............... 250/221 |

FOREIGN PATENT DOCUMENTS

| | | |
|---|---|---|
| DE | 3832720 A1 | 3/1990 |
| DE | 3915631 C2 | 11/1990 |
| DE | 4119180 A1 | 12/1992 |
| DE | 4142702 A1 | 6/1993 |
| DE | 4344485 C2 | 6/1994 |
| DE | 4301538 A1 | 7/1994 |
| DE | 4320485 A1 | 12/1994 |
| DE | 4434233 A1 | 1/1995 |
| DE | 69021354 T2 | 8/1995 |
| DE | 19518978 A1 | 11/1995 |
| DE | 19516324 A1 | 10/1996 |
| DE | 19603267 A1 | 7/1997 |
| DE | 19757840 C1 | 9/1999 |
| DE | 19815149 A1 | 10/1999 |
| DE | 19910667 A1 | 9/2000 |
| DE | 19947766 A1 | 5/2001 |
| DE | 2015340 U1 | 8/2001 |
| EP | 0482604 A2 | 4/1992 |
| EP | 0512872 A1 | 11/1992 |
| EP | 0578129 A2 | 1/1994 |
| EP | 0578129 A3 | 1/1994 |
| EP | 0860714 A1 | 8/1998 |
| JP | 08220234 A | 8/1996 |
| JP | 2000075030 A | 3/2000 |

OTHER PUBLICATIONS

Hall, D. L. and Llinas, J. L. "An Introduction to Multisnesor Data Fusion" Proceedings of the IEEE, IEEE., Jan. 1997, pp. 6-23, XP000686448 New York, US.

Blackman, S. et al.: "Design and Analysis of Modern Tracking Systems" 1999, Artech House.

Becker, J.C., "Fusion of Heterogeneous Sensors for the Guidance of an Autonomous Vehcle", Proceedings of the Third International Conference on Information Fusion, 2000, Jul. 10-13, Paris, France, pp. WeDs-11-18.

* cited by examiner

| | | | |
|---|---|---|---|
| Read in the raw data set of the laser scanner 10 | | | 150 |
| Transformation of the coordinates of the raw data elements into a common Cartesian coordinate system | | | 152 |
| Article recognition and article tracking for the read-in raw data set | | | 154 |
| For each new scan of a laser scanner | | | |
| | Read in the next raw data set of the laser scanner | | 156 |
| | Transformation of the coordinates of the raw data elements into the common Cartesian coordinate system | | 158 |
| | Article recognition and article tracking for the last raw data set read in | | 160 |
| | Form article groups respectively associated with an object | | 162 |
| | Read in the speeds of the laser scanners | | 164 |
| | For each article group associated with an object | | |
| | | Search of the raw data elements for each article field of the article group | 166 |
| | | Fix a reference point in time for the article group | 168 |
| | | For each raw data element in the article group | |
| | | | Calculation of the associated speed from the speed of the detecting laser scanner and from the speed of the associated article | 170 |
| | | | Calculation of the time difference | 172 |
| | | | Displacement of the coordinates | 174 |
| | Form an article group related scan from the corrected data elements | | 176 |
| | Article recognition and article tracking on the basis of the corrected data elements of the article group related scan | | 178 |
| | Output of data of the article recognition and article tracking | | 180 |

Fig. 4

CORRECTION METHOD FOR DATA OF A PLURALITY OF OPTOELECTRONIC SENSORS

CROSS-REFERENCE TO RELATED APPLICATIONS

This application is a US National Stage of International Application No. PCT/EP02/06594 filed 14 Jun. 2002 (14.06.2002). This application claims the benefit of German Application Nos. 101 28 954.5, filed 15 Jun. 2001 (15.06.2001); 101 32 335.2, filed 04 Jul. 2001 (04.07.2001); 101 48 062.8, filed 28 Sep. 2001 (28.09.01); and 101 54 861.3, filed 08 Nov. 2001 (08.11.2001). The disclosure(s) of the above applications are incorporated herein by reference.

The present invention relates to a method for the provision of corrected data for the production of a model of a monitored zone which is contained in respective fields of view of at least two optoelectronic sensors, in particular laser scanners, for the determination of the position of detected objects, to a corresponding method for the production of a corresponding model and to an apparatus for the carrying out of the method.

Optoelectronic sensors for the determination of the position of objects detected by them, in particular lasers scanners for positional detection, are generally known. They are used inter alia, while using corresponding methods for the further processing of the data detected by the sensor, to produce a model of their field of view which can form a basis for further processes, for example for the control of apparatuses in the field of view or in the vicinity of the field of view of the sensor.

A laser scanner which scans the environment with angular resolution detects in this process, for example, whether, at a specific angle, a laser beam transmitted by it is reflected by a point of an object and, if this is the case, from which distance the beam is reflected. A set of data points in the form of polar coordinates is thus obtained which characterize the position of detected object points. Frequently, an object recognition and an object tracking are carried out via the position of individual detected object points on the basis of the data transmitted by the sensor in order to recognize objects in the field of view of the sensor as a collection of object points, with recognized virtual objects in the model being associated with corresponding objects in the field of view of the sensor. The virtual object information of the model is then used in subsequent processes.

Such sensors can be used, for example in vehicles, but also in stationary devices, to observe a monitored zone, for example in front of the vehicle. In order to expand the observed zone, at least two sensors can be used in this process whose fields of view overlap as a rule. If virtual objects detected by the sensors are located in the overlapping region, respectively different virtual object information with respect to the same object is passed on to the subsequent processes by the sensors. Since only one virtual object should be associated with one object in the model of the detected environment, the process must then carry out a so-called virtual object fusion. In this process, different virtual objects of the individual sensors, which correspond to an object, are fused to form one new virtual object.

In known methods, this virtual object fusion takes place solely on the basis of the virtual object data. However, this has the disadvantage that only a low accuracy of the model is given—relative to the effort—after the virtual object fusion. This is in particular the case when the objects move relative to the sensors.

It is the object of the invention to provide a method and an apparatus which permits the production of a model of a monitored zone in the field of view of at least two optoelectronic sensors for the positional determination of objects with high accuracy.

The object is satisfied by a method having the features of claim 1.

The method in accordance with the invention provides corrected data of the sensors for the production of a model of a monitored zone which lies in respective fields of view of at least two optoelectronic sensors, in particular laser scanners, for the determination of the position of detected objects and object points, said data being able to form the basis for a uniform object recognition and/or object tracking.

The monitored zone lies inside the fields of view of the individual sensors which will admittedly overlap as a rule, but which do not necessarily have to do so. The monitored zone in the sense of the invention can also be given by a number of fields of view which do not come into contact with one another or do not overlap one another and which correspond to the number of sensors.

The optoelectronic sensors can basically be any desired sensors by means of which the position of individual points of an object can be detected, in particular corresponding laser scanners.

The provision of corrected data takes place on the basis of sets of raw data elements which correspond to object points in the monitored zone. The raw data elements of a set are detected in each case by one of the sensors in a scan of the field of view such that this set is associated with the corresponding sensor. The raw data elements include at least the position, that is the coordinates, of object points which were detected by the associated sensor. These coordinates can be coordinates in any desired coordinate system such as Cartesian, polar or spherical coordinate systems. If, as is as a rule the case with laser scanners, for example, the spacings of reflections are detected as positional coordinates with sequential scanning angles characterized by a continuous index and with fixed increments, only the indices and the spacings can also be used as coordinates, with the angular increments being known.

The sets of raw data elements of different sensors with a specific time association relative to one another form a group which corresponds to a total scan by all sensors. Only a time association is of importance at all, but not a complete synchronicity of the scanning procedures. The time association can be given, for example, in that all scans are started and ended within a specific time interval and in particular in that the scans corresponding to the respective sets overlap in time.

The coordinates contained in the raw data elements are transformed into a common coordinate system for each set of the group, while taking account of the relative position of the respective sensors, in order to form corrected sets of corrected data elements which correspond to the sets of raw data elements of the group.

If the coordinates of the raw data elements of different sensors are not of the same type, a transformation into a coordinate system of the same type can initially take place in the transformation. In accordance with the position of the sensors relative to one another, which is required to be known, the coordinates of the same type can be transformed by a corresponding displacement into a common coordinate system with a common coordinate origin, that is a coordinate origin which is the same for all sensors.

The sets of raw data elements can be read in before the transformation, but the transformation of the raw data elements of a sensor can also already take place before the reading in of the raw data elements of this sensor or of another sensor is ended, since the transformation can take place independently for each raw data element. If one or more evaluation devices by means of which the process can be carried out are provided in one or more of the sensors, it is also possible to access the raw data elements directly in a memory of the evaluation device which are stored there in accordance with other functions of the evaluation unit.

The corrected data elements can be output, stored or directly further processed depending on the type of further processing.

The method in accordance with the invention in particular makes it possible to carry out a, for example conventional, object detection and/or object tracking on the total set of the corrected data elements.

This has the advantage that an object detection and/or an object tracking can take place in the overlapping zone of the sensors for an object on the basis of a larger number of corrected data elements associated with the same object point, which substantially increases the accuracy. Furthermore, corrected data from the different perspectives of the sensors can be fused for the same object, which facilitates the object recognition by the view thus expanded, on the one hand, and avoids complications by the fusion of only partly overlapping virtual objects which belong to the same object, on the other hand.

Advantages result in particular with sensors with polar taking characteristics such as laser scanners. Even small objects in the near range can mask a very large angular range in the field of view with such sensors such that more remote objects in this angular range can no longer be detected. When a plurality of sensors are used, of which at least one can detect such a masked, more remote object, even the object detected only by the one sensor and hidden for another sensor can be recognized by the correction in accordance with the invention of the data for the preparation of a model of the monitored zone.

Furthermore, the complex process of object recognition and object tracking only has to be carried out once, whereby the method works more efficiently with the same accuracy than methods in which the object recognition and/or object tracking takes place separately for each set of raw data elements.

A further subject of the invention, which satisfies the object, is therefore also a method for the production of a model of a monitored zone which lies in respective fields of view of at least two optoelectronic sensors, in particular laser scanners, for the determination of the position of detected objects and contains object points, in which the method in accordance with the invention for the provision of corrected data is carried out, and an object detection and/or object tracking takes/take place on the basis of the total set of all corrected data elements. When the object recognition and/or object tracking has/have been carried out, the calculated virtual object data can be output, stored or used in subsequent processes.

Preferred further developments and embodiments of the invention are described in the dependent claims, in the description and in the drawings.

The raw data elements can preferably contain further information such as the echo amplitude of the reflection which can be used in the object recognition. Such data can also be corrected as part of the correction of the coordinates, if their value depends on kinematic data or on the point in time of the detection, or can otherwise remain unchanged.

The raw data elements of the sets of a group are, as a rule, not detected simultaneously, since the sensors do not necessarily start their scans at the same time (latency between sensors), on the one hand, and the raw data elements are only detected successively in the same scan of a sensor (internal scan latency), on the other hand. On a movement of the sensors, in particular a relative movement, this results in the coordinates of raw data elements, which correspond to object points detected at different times, being displaced in accordance with the time differences and with the movement of the sensors. The coordinates of the raw data elements are therefore in each case preferably corrected, on the formation of the corrected sets, for each set in accordance with the movement of the sensor detecting them and in accordance with the difference between a time defined as the point in time of the detection of the respective raw data elements and a reference point in time.

A correction is thus carried out such that the coordinates at least approximately describe the position of the object points relative to a common reference point in time. For this purpose, a time is initially fixed for each raw data element which is defined as the point in time of the detection of the respective raw data elements. Although the measurement of the detection time of each raw data element would result in the most accurate correction, it can be sensible for practical reasons and can be sufficient within the framework of the required accuracy of the correction for another specific, suitable time to be defined as the point in time of the detection.

A time defined as the point in tome of the detection of the set is particularly preferably used as the point in time of the detection of the raw data elements for all raw data elements of a set. This means that the same detection time is associated with all raw data elements, whereby the timewise displacements of the scans between different sensors, that is the latency between the sensors, can be taken into account. The time of the start or of the end of a scan is advantageously fixed in this process, for example, for the respective sensor and is used as the point in time of the detection of the set, with it generally being sufficient only to know the corresponding time differences for, in each case, one pair of sensors.

These time differences will frequently be smaller than the time length of a scan by a sensor and thus than the time interval of the detection of different raw data elements in the same scan by a sensor. The time interval of the detection of the individual raw data elements of the set relative to one another is therefore particularly preferably considered in the fixing of the time defined as the point in time of the detection of a raw data element. The time defined as the point in time of the detection of a raw data element can then result from the time defined as the point in time of the detection of the set and from the time difference between the detection of raw data elements during a scan, which can be derived, for example, when a constant scanning speed is assumed, from the position of the raw data element in the series of raw data elements following one another timewise.

Although the determination of the time defined as the point in time of the detection of a raw data element can take place absolutely, it is only necessary relative to the reference point in time, since an approximate correction should only take place with respect to the movement in the time interval between the detection and the reference point in time. This reference point in time can be selected differently for each set if only the displacements due to the different detection times during the scan are corrected. However, a reference time point which is the same for the group of sets is preferably selected. This reference point in time can generally be freely selected, but preferably lies within the time interval from the start of the earliest scan by one of the sensors up to the end of the last scan by one of the sensors, with the scans each corresponding to sets of the group. The approximation for the correction displacement is hereby more accurate, on the one hand, since an approximation of the movement, which is not necessarily constant in time, only takes place over shorter times. On the other hand, in this case, the determination of the time defined as the point in time of the detection of a raw data element is substantially simplified, in particular if, for example, the start of a scan is selected as the reference point in time by one of the sensors.

The movement of the sensors, which is used in the method in accordance with the invention, can be the actual, real movement of the sensors or a movement approximated to the actual movement. The movement of the sensors can in this process, for example, be taken into account in dependence on the quality of the correction via its speeds or also via its speeds and accelerations, with vectorial values, that is values with amount and direction, being meant here. A rotational movement of the arrangement can also in particular be taken into account if the sensors are located in a timewise constant position relative to one another.

The data on these kinematic values can be read in, for example. With vehicles, for example, the vehicle's own speed and the steering angle or the yaw rate can be used via corresponding vehicle sensors to specify the movement of the sensors. This movement of the sensors can then be approximated, for example, solely by the movement of the vehicle such that, on rotational movements, the same orbital speed is associated with all sensors irrespective of their arrangement. In a better approximation, for the calculation of the movement of the sensors from the kinematic data of a vehicle, their position on the vehicle can naturally also be used.

The movement of the sensors or the kinematic data can, however, also be determined from a corresponding parallel object detection and/or object tracking in the sensors or from a subsequent object recognition. Kinematic data are preferably used which are detected closely in time to scans by the sensors corresponding to the sets of the group, particularly preferably during the scan by one of the sensors.

The displacement caused by the movement within the time difference can preferably be calculated for the correction using known kinematic formulae from the kinematic data of the movement and from the time difference between a time defined as the point in time of the detection of the respective raw data elements and a reference point in time of the group or of the set and the coordinates in the raw data elements can be corrected accordingly. Generally, however, modified kinematic relationships can also be used.

The corrections can take place in this process as soon as the kinematic data and the time differences have been fixed. They can in particular then take place separately or jointly for the sensors or for the associated sets of a group and in each case before, during or after the transformation into a common coordinate system.

If two moving object points are not detected simultaneously due to the latency between the sensors and/or due to the internal scan latency, the positions of the object points determined from the coordinates of the associated raw data elements, and in particular their spacings, generally deviate from the actual positions and spacings. These deviations can in particular substantial with fast moving objects and impede a later object recognition and/or object tracking after the correction and fusion of the corrected data in accordance with the methods described above.

An object recognition and/or object tracking is therefore preferably carried out on the basis of the raw data elements of the set for each set of raw data elements of the group before forming the corresponding corrected set, with raw data elements being associated with each recognized object and at least one of the movement data calculated in the object tracking being associated with each of these raw data elements. On the forming of the corrected sets, results of the object recognition and/or object tracking, in particular some of the movement data, are then used for the correction on the basis of the individual sets. By an object recognition and/or object tracking being carried out for each set, i.e. separately for each sensor, and independently of the provision of corrected data and of a subsequent object recognition and/or object tracking, a virtual object-related correction of errors of the raw data elements on the basis of the aforesaid time latencies is possible. Raw data elements which correspond to fast moving object points can be corrected very exhaustively with respect to the latencies such that an object recognition and/or object recognition n the basis of the corrected data elements is possible simply and with high accuracy.

Known processes can be used in the object recognition and/or object tracking for each of the sets of raw data elements, with generally comparatively simple methods being sufficient. The object detection and/or object tracking can take place solely with reference to the raw data elements of a set or also after transformation to a common coordinate system.

In the described further development of the method in accordance with the invention, in the forming of the corrected sets for each set, the coordinates of the raw data elements are preferably corrected in accordance with the movement data associated with them and in accordance with the difference between a time defined as the point in time of the detection of the raw data elements and a reference point in time of the group or of the set. This correction can naturally take place alone or in addition to the aforesaid correction of the displacement on the basis of the sensor movement and of the time latencies.

Reference is made to the above statements with respect to the difference between a time defined as the point in time of the detection of the raw data elements and a reference point in time of the group or of the set, which also apply accordingly here when the movement of the sensor is replaced by the movement of the object. A reference point in time which is the same for all sets of the group can in particular be selected as the reference point in time.

The movement data can be any desired kinematic data of a virtual object, preferably for example depending on the required quality of the correction, its speed or also its speed and acceleration, with again vectorial values, that is values with amount and direction, being understood hereby. The movement data associated with the raw data elements associated with a virtual object can be selected to be the same in this process, in particular the same as the movement data of the virtual object. This is in particular sensible when the movement data only include the speed of the virtual object, since the same speeds have consistently to be associated with all the raw data elements forming the virtual object. However, movement data can also be individually associated with the raw data elements associated with a virtual object, which is in particular sensible when the movement data of the virtual object also include possible rotational movements of the virtual object, since then the individual virtual object points have different instantaneous speeds. A particularly large correction of the errors caused by the time latencies is hereby possible in the raw data elements with comparatively fast rotating objects, for example vehicles with high yaw rates.

As in the aforesaid method, the correction can take place with reference to corresponding kinematic relationships between the displacement, the movement values and the time length of the movement, with modifications also being possible here.

In the aforesaid methods for the correction of errors in the raw data elements which are caused by the time latencies between sensors and by the internal scan latencies, the reference point in time preferably lies between the earliest time (defined as the detection time) of a raw data element of one of the sets of the group and the timewise last time (defined as the detection time) of a raw data element of one of the sets of the group. The errors in the calculation of the correction displacement can in particular thereby be reduced with fast changes of the movement data.

In a further embodiment of the method in accordance with the invention in which the results of an object detection and/or an object tracking on the basis of the individual sets, in particular some of the movement data, are used for the correction, a plurality of reference points in time are used which are each associated with a virtual object group corresponding to an object.

Before or on the formation of the sets of corrected data elements, in each case virtual object groups associated with an object, with virtual objects which were prepared on the basis in each case of a set of raw data elements and are recognized as corresponding to an object, are formed for this purpose. For this purpose, for example, methods for object detection and/or object tracking are used or, if an object in the field of view of a first sensor enters into the field of view of a second sensor, methods for the corresponding extrapolation of data from the field of view of the first sensor. Furthermore, the associated raw data elements in each set are sought for each virtual object group associated with an object. In addition, for each virtual object group a reference point in time associated with it is fixed. On the formation of the sets of corrected data elements, for each virtual object of the virtual object group associated with an object, the coordinates of the raw data elements associated with it are then corrected in all sets of raw data elements of the group corresponding to the movement of the sensor detecting these raw data elements and/or of the movement data associated with these raw data elements and to the difference between a time defined as the point in time of the detection of the raw data element and the reference point in time of the virtual object group.

The movement data can be any desired kinematic data of a sensor or of a virtual object, preferably, for example depending on the required quality of the correction, their speeds or also their speeds and accelerations, with again vectorial values, that is values with amount and direction, being understood by this. The movement data associated with the raw data elements associated with a virtual object can be selected to be the same in this process, in particular the same as the movement data of the virtual object. This is in particular sensible when the movement data only include the speed of the virtual object, since then the same speed has consistently to be associated with all the raw data elements forming the virtual object. However, movement data can also be individually associated with the raw data elements associated with a virtual object, which is in particular sensible when the movement data of the virtual object also include possible rotational movements of the virtual object, since then the individual virtual object points have different instantaneous speeds. A particularly large correction of the errors caused by the time latencies is hereby possible in the raw data elements with comparatively fast rotating objects, for example vehicles with high yaw rates.

As in the aforesaid methods, the correction can take place with reference to corresponding kinematic relationships between the displacement, movement values and length of time of the movement, with modifications also being possible here.

Reference is made to the above statements with respect to the difference between a time defined as the point in time of the detection of the raw data elements and a reference point in time of the group or of the set, which also apply accordingly here. However, contrary to these, a reference point in time is selected individually for each virtual object group associated with an object here and this preferably lies close to the point in time of a measurement of an associated raw data element.

The reference point in times associated in each case with the virtual object groups preferably lie between the earliest time (defined as the point in time of the detection) of a raw data element associated with one of the virtual objects of the respective virtual object group and the timewise last time (defined as the point in time of the detection) of a raw data element associated with a virtual object of the respective virtual object group, since the accuracy of the correction hereby increases. This is in particular of importance with accelerated objects or corresponding virtual objects, since their movement data can change a lot during the actual detection time of the corresponding raw data elements and the reference point in time. Particularly preferably, at least one reference point in time associated with a virtual object group is the detection point in time of a raw data element associated with a virtual object of this virtual object group, since the accuracy of the correction can hereby be further increased.

The corrected data elements for a virtual object group particularly preferably also contain the reference point in time associated with this virtual object group such that it can be taken into account in a subsequent object detection and/or object tracking. Each virtual object group therefore attains more or less its own "age".

In the aforesaid methods in accordance with other embodiments, in contrast, a common reference time with reference to which the raw data elements are corrected is associated with the corrected data elements in total. The total set of the corrected data elements in these other embodiments can therefore be considered as corresponding to a scan of the total region. In the last described embodiment, in contrast, corrected data elements are provided in each case corresponding to a virtual object group, which can in each case be considered so to say as a virtual object group related scan.

In the method in accordance with the invention for the production of a model of a monitored zone, in a preferred embodiment an object recognition and/or object tracking is therefore carried out separately for each virtual object group on the basis of the corrected data elements associated with it, for which purpose the associated reference points in time are optionally taken into account.

The corresponding object recognition and/or object tracking can in this process take place directly after forming the virtual object group and the correction of the raw data elements or only after provision of all corrected data elements, with the information on which corrected data elements are associated with a virtual object group being able to be contained in the corrected data elements.

Such a method also leads to very good results with moving sensors and fast moving objects.

The aforesaid embodiments of the method, in which an object recognition and/or object tracking is used in each case separately on each set of raw data elements, can be carried out in full on a data processing device. The object recognition and/or object tracking are, however, preferably carried out on the basis of the raw data elements of a set in an evaluation unit of the sensor detecting these raw data elements of the set and the other steps are carried out in a separate data processing device. Part of the data processing is thereby transferred to the sensors, on the one hand. Many known sensors, in particular laser scanners, which can be used in connection with the method in accordance with the invention, already have a suitable evaluation unit as standard, on the other hand.

The method in accordance with the invention is preferably carried out iteratively for respective sequential scans of the sensors, with a new group being formed after reading in at least one set of raw data elements associated with one of the sensors which were detected at a later scan than the raw data elements of the set of raw data elements previously contained in the group of sets of raw data elements and associated with the sensor. This new group contains the sets of raw data elements of the previous group associated with other sensors and the at least one new set of raw data elements. Subsequently, the method in accordance with the invention is also carried out for the new group of sets of raw data elements, with data already obtained in the preceding iteration optionally also being used, that is not being calculated again.

When a plurality of sensors are used, corrected data elements are hereby more frequently contained, which permits a more frequent carrying out of an object recognition and/or an object tracking. This then moreover runs under more favorable conditions, since only a comparatively small part of the data of the respective total scan or of the virtual object related scan is changed, which above all facilitates the object tracking in total.

The method in accordance with the invention is preferably used for the provision of corrected data for the production of models of monitored zones, in which the fields of view of the sensors overlap, since in this process the advantages of a virtual object fusion after the correction and fusion of the raw data elements of all sensors are particularly pronounced.

The methods in accordance with the invention can preferably be carried out on corresponding data processing plants using corresponding programs. In particular standard computers with corresponding programs can be used; however, fast digital signal processors can also be used, for example.

In a preferred embodiment, the method is carried out completely on one evaluation unit or—distributed—over a plurality of evaluation devices which are present in one sensor or in a plurality of sensors. In particular in the case of laser scanners which already have evaluation units with processors such as digital signal processors and memory devices, a carrying out of the complete method on one or more of the evaluation units is advantageous. An apparatus for the production of a model of a monitored zone then contains at least two optoelectronic sensors, in particular laser scanners, whose fields of view include a monitored zone and of which at least one has an evaluation unit which is designed for the carrying out of the method in accordance with the invention and for the output of corresponding data, and data links for the transmission of the raw data elements detected by the laser scanners to the evaluation device or evaluation devices in one or more sensors.

A further subject of the invention is a computer program with program code means to carry out the method in accordance with the invention for the provision of corrected data or the method in accordance with the invention for the production of a model of a monitored zone, when the program is carried out on a computer.

A further subject of the invention is a computer program product with program code means which are stored on a machine-readable data carrier in order to carry out the method in accordance with the invention for the provision of corrected data and/or the method in accordance with the invention for the production of a model of a monitored zone, when the computer program product is carried out on a computer.

The invention moreover includes an apparatus for the production of a model of a monitored zone with at least two optoelectronic sensors, in particular laser scanners, whose fields of view include a monitored zone, with a data processing device which is designed to carry out the method in accordance with the invention for the provision of corrected data or the method in accordance with the invention for the production of a model of a monitored zone, and with data links for the transmission of the raw data elements detected by the laser scanners to the data processing device.

A further subject of the invention is an apparatus for the production of a model of a monitored zone with at least two optoelectronic sensors, in particular laser scanners, whose fields of view include the monitored zone and which each have an evaluation device for the object recognition and/or object detection and for the output of corresponding virtual object data, with a data processing device which is designed to carry out the method in accordance with the invention for the provision of corrected data or the method in accordance with the invention for the production of a model of a monitored zone, and with data links for the transmission of the raw data elements detected by the laser scanners and of virtual object data to the data processing device.

Fast, real-time enabled data links are preferably used in the apparatuses in accordance with the invention.

Preferred embodiments of the invention will now be described by way of example with reference to the drawing. There are shown.

Figure 1:
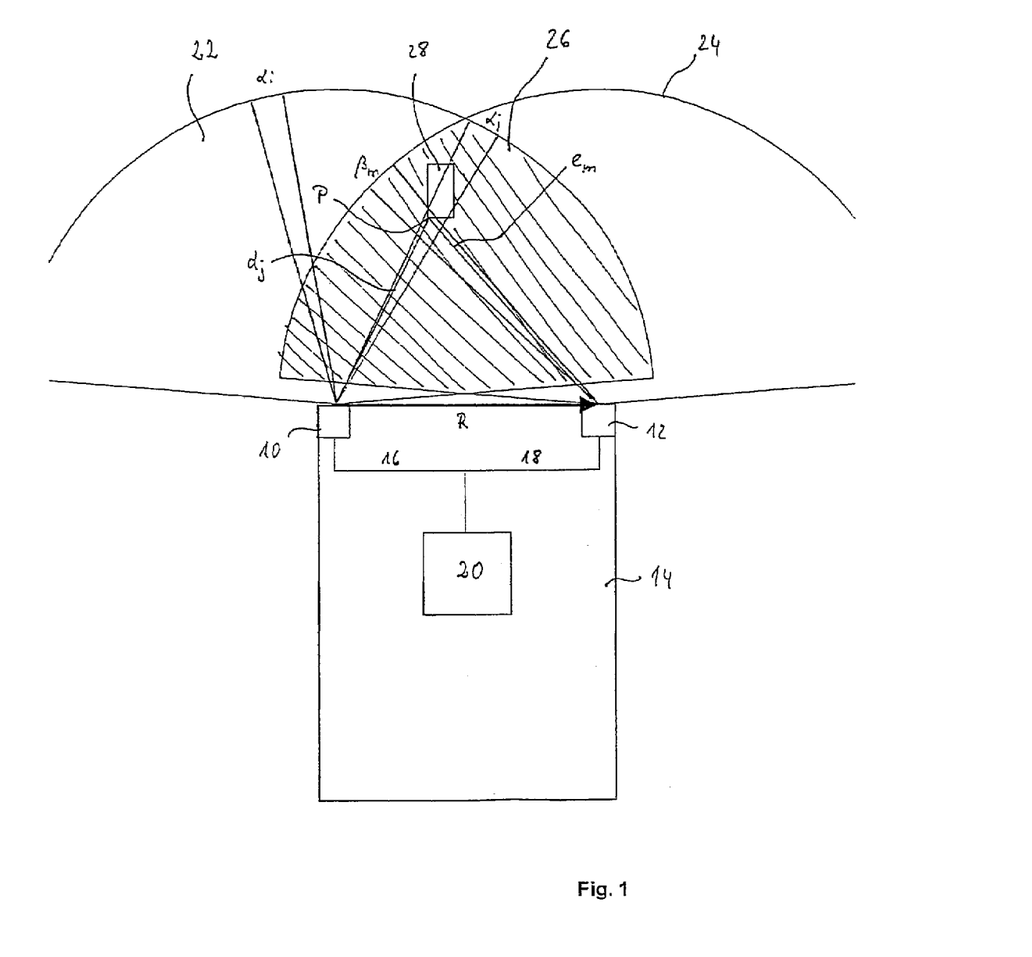
FIG. 1 a schematic plan view of an apparatus in accordance with the invention for the production of a model of a monitored zone.

In FIG. 1, two laser scanners 10 and 12 for the detection of the position of objects are held on a vehicle 14. The laser scanners 10 and 12 are connected via data links 16 and 18 to a data processing device 20 which has an output device (not shown).

The laser scanners 10 and 12 have in each case as fields of view 22 and 24 circle sectors which overlap in the monitored zone 26. The monitored zone 26 can also completely include both fields of view 22 and 24. The fields of view have been selected to be very small for better illustration; typically, the range of laser scanners is very much larger. An object 28 is located in the monitored zone.

The laser scanners 10 and 12 each operate in accordance with the same method. The laser scanner 10 transmits, in a known manner, a respective laser beam orbiting at a constant angular speed, with it being detected likewise in an orbiting manner at constant time intervals $\Delta\tau$ at times $\tau_i$ in fixed angular ranges with a mean angle $\alpha_i$ whether the laser beam is reflected by a point of an object. The index i runs in this process from 1 up to the number of angular ranges in the field of view. Only individual ones of these angular ranges are shown, inter alia the angular range associated with the mean angle $\alpha_i$. The angular regions are shown exaggeratedly large here for clearer illustration. In this case, the spacing $d_i$ of the point from the laser scanner 10 is determined with reference to the run time of the laser light. The laser scanner 10 therefore detects the angle $\alpha_j$ and the spacing $d_j$ determined at this angle, that is the position of the object point in polar coordinates, as raw data elements for the object point P of the object 28. The set $M_{10}$ of the raw data elements which were detected by the laser scanner 10 contains total raw data elements ($\alpha_k$, $d_k$), where k is a natural number between 1 and the number of the raw data elements detected by the laser scanner 10. The laser scanner 12 correspondingly detects raw data elements ($\beta_l$, $e_l$), where $e_l$ is the spacing of an object point which was detected in the angular range about $\beta_l$ and l is a natural number between 1 and the number of the raw data elements detected by the laser scanner 12. These raw data elements form a set $M_{12}$ of raw data elements which is associated with the laser scanner 12. The object point P has the coordinates ($\beta_m$, $e_m$) in FIG. 1.

The laser scanners 10 and 10 each scan their fields of view in sequential scans so that a time sequence of raw data sets is produced for each of the laser scanners.

A group of sets of raw data elements associated with one another timewise is formed in each case by sets $M_{10}$ and $M_{12}$, with the start of the scan taking place for one of the sets within the time period of a scan for the other set. With sequential scans of the field of view and a corresponding sequential output of raw data sets, this means that a set of raw data elements can in each case be contained in two sequential groups of raw data sets.

The data processing device 20 can be a conventional personal computer which is fitted with a sufficiently fast processor, a main memory and corresponding interfaces for the data links 16 and 18. Generally, one data link between the laser scanners is sufficient if they have evaluation units on which the preparation of the model of the monitored zone is possible. Evaluation units with correspondingly programmed digital signal processors would, for example, be suitable.

Figure 2:
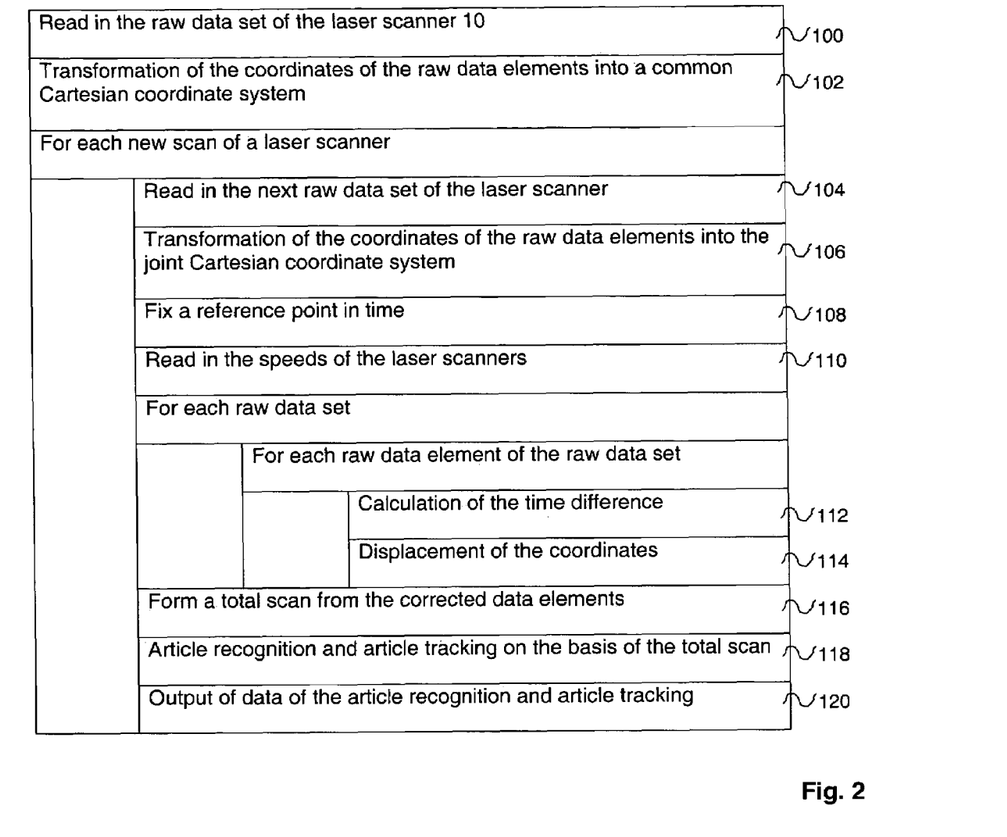
FIG. 2 a structogram-like diagram for the flow of a method for the production of a model of a monitored zone in accordance with a preferred first embodiment of the invention.

In a first method illustrated in FIG. 2 for the preparation of an environmental model, corrections are carried out with respect to the movement of the laser scanners 10 and 12. For this purpose, in step 100, the raw data sets of the laser scanner 10 are first read in and are transformed in step 102 into a common Cartesian coordinate system. The system of the laser scanner 10 is used as the common coordinate system such that its raw data elements can be converted into Cartesian coordinates without any further displacement only in accordance with known formulae.

In step 104, the next raw data set output by one of the laser scanners is read in, with—starting from step 100—the start of the scan for the set $M_{12}$ taking place during the scan of the set $M_{10}$ such that the scan for the set $M_{12}$ runs later than that for the set $M_{10}$. In the further course of the method, raw data sets are respectively read in alternately from one of the two laser scanners such that the respectively latest raw data set is always read in for each laser scanner. The two sets each form a group of raw data sets in this process. The times of the start of the scan are each determined by a corresponding signal of the laser scanner and the time of the occurrence is stored on its occurrence.

In step 106, the coordinates of the raw data elements of the raw data set read in at step 104 are first converted into Cartesian coordinates. The coordination of the raw data elements of the newly read in set—this is $M_{12}$ starting from step 100—are displaced in accordance with the fixed relative vector R from the laser scanner 10 to the laser scanner 12 after the conversion into Cartesian coordinates, when the set is associated with the laser scanner 12, whereby the coordinates in the common coordinate system result.

In step 108, a reference point in time $t_F$ is then fixed, for example the point in time of the start of the later scans corresponding to the raw data sets.

In step 110, respective vectorial speeds for the laser scanners are read in. The corresponding speeds $v_{10}$ or $v_{12}$ of the laser scanners 10 and 12 respectively are determined in this process by corresponding sensors (not shown in FIG. 1) of the vehicle while taking into account the position of the laser scanners 10 and 12. In a simpler approximation, the speed of the sensors can be given by the vehicle speed without taking into account the position of the sensors. These speeds are each associated with the raw data elements in the sets $M_{10}$ and $M_{12}$.

The steps 112 and 114 are then carried out for each raw data element in each of the sets $M_{10}$ and $M_{12}$.

In step 112, the difference between a time defined as the point in time of the detection of the raw data element and the reference time is calculated. The time defined as the point in time of the detection results from the point in time of the start of the scan and from the position of the angular range in which the raw data element was detected. If the raw data element was detected in the angular range $\alpha_i$ or $\beta_i$, an amount $i*\Delta\tau$ is added at the time of the start of the scan.

In step 114, the coordinates of the raw data element are then displaced about the vector which results from multiplication of the speed vector $v_{10}$ or $v_{12}$ associated with the raw data element by the time difference from step 112.

In step 116, a total scan is formed from these corrected data on the basis of which an object recognition and/or object tracking is carried out in step 118 and corresponding data are output in step 120.

Thereupon, operation is continued with step 104 with the reading in of the next raw data set which would be the next raw data set $M_{10}$, which replaces the previous set $M_{10}$, in the example, starting from step 100 after running through the following steps. The set with the start of the scan earlier in time is then the unchanged set $M_{12}$.

Figure 3:
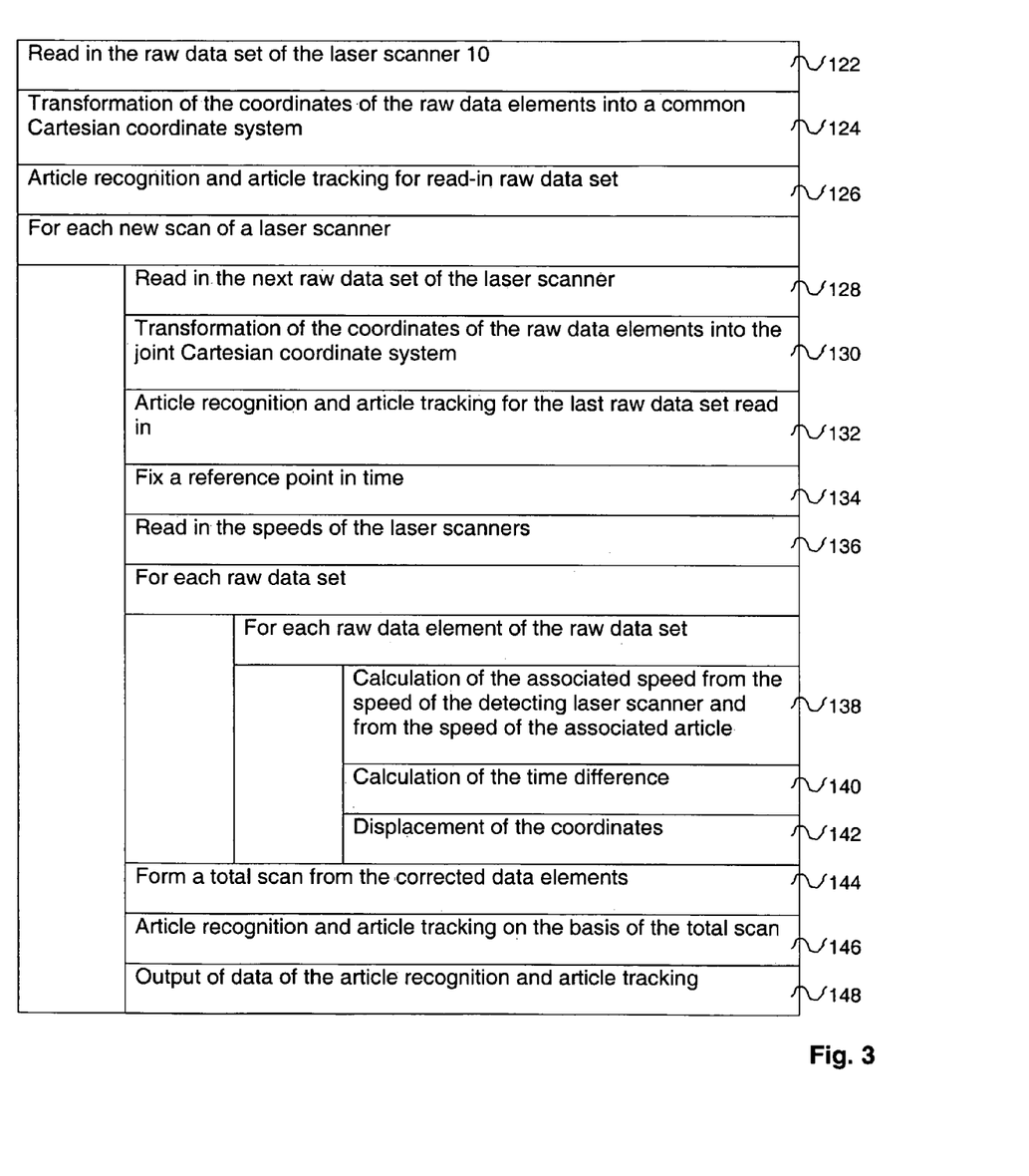
FIG. 3 a structogram-like diagram for the flow of a method for the production of a model of a monitored zone in accordance with a preferred second embodiment of the invention.

The method in accordance with a second preferred embodiment of the invention shown in FIG. 3 runs analog to the first method in accordance with FIG. 2, with corrections additionally taking place with respect to the movement of objects. Steps which are also carried out in this method are therefore not explained in more detail.

The steps 122 and 124 as well as 128 and 103, in which raw data sets are read in and are transformed into a common coordinate system, correspond to the steps 100 to 106 of the method in accordance with FIG. 2.

Unlike the method in accordance with the first embodiment, an object recognition and/or object tracking is carried out in steps 126 and 132 on the raw data set $M_{10}$ or on the next raw data set read in and the speeds of the recognized objects and the association of the raw data elements to the respective virtual object are stored as kinematic data. Virtual object speeds associated in each case with the raw data elements hereby result. Corresponding methods, known to the person skilled in the art can, for example, be used for the object recognition and/or object tracking. The steps 126 and 132 can also be carried out before the steps 124 and 130, with a transformation then also being necessary of the virtual object movement data gained in the process into the common coordinate system.

After fixing the reference point in time in step 134, which corresponds to step 108 of the method in accordance with FIG. 2, the vectorial speeds $v_{10}$ and $v_{12}$ are read in at step 136, which corresponds to step 110 in FIG. 2.

In step 138, a speed vector associated with the raw data element is then determined for each raw data element in each raw data set by addition of the speed $v_{10}$ or $v_{12}$ associated with the raw data set or with the laser scanner detecting it and of the virtual object speed associated with the corresponding raw data element.

In step 140, which corresponds to step 112 in FIG. 2, the difference between a time defined as the point in time of the detection of the raw data element and the reference time is calculated.

In step 142, the coordinates of the raw data element are then displaced by the vector which results from the multiplication of the speed vector associated with the raw data element in step 138 by the time difference from step 140.

In steps 144, 146 and 148, which correspond to steps 116, 118 and 120 in FIG. 2, a total scan is then formed with data elements corrected on a common reference point in time and, based on this, an object recognition and/or object tracking is/are calculated independently of the object recognitions and/or object trackings in the steps 126 and 122 and corresponding data are output.

The method is then continued with step 128.

Figure 4:
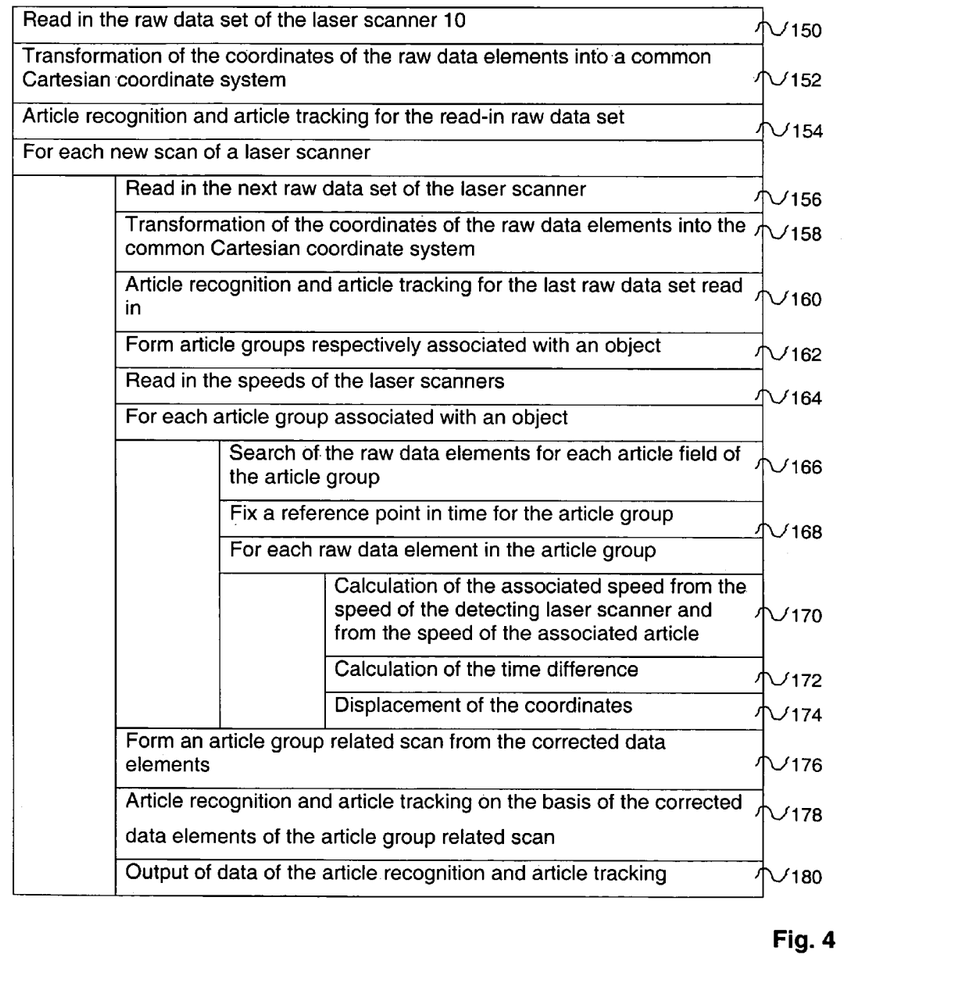
FIG. 4 a structogram-like diagram for the flow of a method for the production of a model of a monitored zone in accordance with a preferred third embodiment of the invention.

In the method in accordance with a third embodiment of the invention illustrated in FIG. 4, in contrast to the method in accordance with the second embodiment in accordance with FIG. 3, an object recognition and object tracking is carried out separately after the correction of the data for each object. Some steps are carried out in this process as in the method in accordance with the second embodiment and are therefore not described in more detail here.

In the steps 150, 152, 154, 156, 158 and 160, which correspond to the steps 122, 124, 126, 128, 130 and 132 of FIG. 3, the raw data elements are read in whose coordinates are transformed into a common coordinate system and an object recognition and/or tracking is calculated on the respective raw data sets.

In step 162, virtual object groups, which contain virtual objects which are recognized as corresponding to the same object, are formed from the virtual objects recognized in steps 154 and 160 in all sets of raw data elements by using known methods for the object recognition and/or object tracking.

The vectorial speeds of the sensors or laser scanners 10 and 12 are read in at step 164 corresponding to step 108 in FIG. 2.

The following steps 166 to 180 are carried out for all virtual object groups:

In step 166, the raw data elements respectively associated with the virtual object are sought for a virtual object group in the two raw data sets $M_{10}$ and $M_{12}$.

In step 168, the time defined as the detection point of time of that raw data element, which was first detected in accordance with the times of the raw data elements defined as the detection point in time, is selected as the reference point in time for the virtual object group.

In step 170, a total speed vector is then determined for each of the raw data elements associated with a virtual object of the virtual object group and is calculated by addition from the read-in speed of that laser scanner which detected the raw data element and from the speed of this raw data element calculated in the object recognition and/or object tracking in step 154 or 160 respectively.

In step 172, the time difference for each of the raw data elements associated with the virtual objects of the virtual object group is then calculated as in step 140 in FIG. 3 and, in step 174, its coordinates are displaced in accordance with the product from the total speed vector and from the time difference.

In step 176, the data elements of a virtual object group corrected in this manner are fused to a scan associated with the virtual object group while forming an association with the respective reference points in time and, in step 178, an object recognition and/or object tracking is/are carried out on this basis whose results are output in step 180.

Alternatively, the steps 166 to 180 can each be carried out after the formation of each virtual object group.

Operation continues with step 156 after running through all virtual object groups.

In summary, the described methods in accordance with the three embodiments differ in that, in the first method illustrated in FIG. 2, a correction only takes place with respect to the movement of the laser scanners and to the time latencies, whereas in the method in accordance with the second embodiment, the movement of detected objects is additionally taken into account in the correction. In these two embodiments, an object recognition and object tracking takes place on the basis of all corrected data after the correction. In the method in accordance with the third embodiment, substantially the same corrections are carried out as in the method in accordance with the second embodiment, that is with respect to the movement of the laser scanners, of the objects and to the time latencies, with the reference points in time, with respect to which corrections are made, however, being related to individual objects and with a separate object recognition and object tracking being carried out in each case for the corrected data elements which correspond to an object.

REFERENCE NUMERAL LIST

10 laser scanner
12 laser scanner
14 vehicle
16 data link
18 data link
20 data processing device
22 field of view
24 field of view
26 monitored zone
28 object

The invention claimed is:

1. A method for provisioning data from a monitored zone, which lies in respective fields of view of at least two, a first and a second, optoelectronic sensors, comprising:
    capturing sets of raw data elements using the at least two sensors, wherein the raw data elements of the sets include coordinates of object detected by the respective detecting sensor and for each set of the coordinates associating a corresponding position of the respective detecting sensor;
    forming a group of the sets of raw data elements from the sets of raw data elements captured by a different sensor of the at least two sensors, where the sets of raw data elements in the group have a specific time association relative to one another;
    performing object tracking for each set of the raw data elements in the group before transforming the coordinates contained therein; and
    for each set of the group, transforming the coordinates contained in the sets of raw data elements into a common coordinate system, while taking account of the relative position of the detecting sensors;
    wherein the steps of forming, performing and transforming are implemented by one or more processors.

2. A method in accordance with claim 1, characterized in that the coordinates of the raw data elements are corrected for each of the sets of raw data elements, in each case in accordance with the actual movement of the sensor detecting it, or with a movement approximated thereto, and in accordance with the difference between a time defined as the point in time of the detection of the respective raw data elements and a reference point in time.

3. A method in accordance with claim 2, characterized in that a time defined as the point in time of the detection of the set is used as the point in time of the detection of the raw data elements for all raw data elements of a set.

4. A method in accordance with claim 2, characterized in that, on the fixing of the time defined as the point in time of the detection of a raw data element, the time interval of the detection of the individual raw data elements of the set with respect to one another are taken into account.

5. A method in accordance with claim 1, characterized in that the coordinates of the raw data elements are corrected for each set in accordance with the movement data associated with them and in accordance with the difference between a time defined as the point in time of the detection of the raw data elements and a reference point in time of the group or set.

6. A method in accordance with claim 2, characterized in that the reference point in time lies between the earliest time (defined as the detection time) of a raw data element of one of the sets of the group and the timewise last time (defined as the detection time) of a raw data element of one of the sets of the group.

7. A method in accordance with claim 1 characterized in that virtual object groups are formed which are associated in each case with an object and which have virtual objects which were prepared on the basis in each case of one set of raw data and are recognized as corresponding to an object;
in that, for each virtual object group associated with an object, the associated raw data elements in each set are sought;
in that for each virtual object group associated with an object, a reference point in time associated with it is fixed; and
in that for each virtual object the coordinates of the raw data elements associated with it in all sets of the group are corrected in accordance with the movement of the respective sensor detecting these raw data elements and/or in accordance with the movement data associated with these raw data elements and in accordance with the difference between a time defined as the point in time of the detection of the raw data element and the reference point in time for the virtual object.

8. A method in accordance with claim 7, characterized in that the reference points in time respectively associated in each case with the virtual object groups lie between the earliest time (defined as the point in time of the detection) of a raw data element associated with a virtual object of the respective virtual object group and the timewise last time (defined as the point in time of the detection) of a raw data element associated with a virtual object of the respective virtual object group.

9. A method in accordance with claim 1, characterized in that the object tracking is carried out on the basis of the raw data elements of a set in an evaluation unit of the sensor detecting the raw data of the set and the other steps are carried out in another data processing device.

10. A method in accordance with claim 7, characterized in that the corrected data elements for an object group also contain the reference point in time associated with this object group.

11. A method in accordance with claim 1, characterized in that it is carried out iteratively for respective sequential scans of the sensors,
wherein, after reading in of at least one original set of raw data elements which are associated with one of the sensors and which were detected in a later scan than the raw data elements of the set of raw data elements previously contained in the group of sets of raw data elements and associated with the sensor, a original group is formed which contains the sets of raw data elements of the previous group associated with other sensors and contains the original set of raw data elements; and
in that is it subsequently also carried out for the original group of sets of raw data elements, with data already obtained in the preceding iteration preferably being used.

12. A method in accordance with claim 1, characterized in that the model is only produced for a monitored zone in which the fields of view of the sensors overlap.

13. A method for the production of a model of a monitored zone which lies in respective fields of view of at least two optoelectronic sensors for the determination of the position of detected objects and contains object points,
in which the method for the provision of corrected data is carried out in accordance with claim 1; and
an object recognition or object tracking takes place on the basis of all corrected data elements.

14. A method in accordance with claim 13, characterized in that an object recognition and/or object tracking is/are carried out on the basis of the corrected data elements separately for each virtual object group, with the associated reference points in time preferably being taken into account.

15. A method in accordance with claim 1, characterized in that it is completely carried out in an evaluation device of one or more sensors.

16. A computer program embodied as computer executable instructions on a computer readable medium, the computer program implementing a method for the provision of corrected data of a monitored zone (26), which lies in respective fields of view (22, 24) of at least two, a first and a second, optoelectronic sensors (10, 12), the computer executable instructions performing the steps of:
capturing sets of raw data elements using the at least two sensors, wherein the raw data elements of the sets include coordinates of object detected by the respective detecting sensor and for each set of the coordinates associating a corresponding position of the respective detecting sensor;
forming a group of sets of raw data elements from sets of raw data elements captured by a different sensor of the at least two sensors, where the sets of raw data elements in the group have a specific time association relative to one another;
performing object tracking for each set of the raw data elements in the group before transforming the coordinates contained therein; and
for each set of the group, transforming the coordinates contained in the sets of raw data elements into a common coordinate system, while taking account of the relative position of the detecting sensors.

17. A computer program product with program code means which are stored on a computer readable medium to carry out a method for the provision of corrected data of a monitored zone (26), which lies in respective fields of view (22, 24) of at least two, a first and a second, optoelectronic sensors (10, 12), the program code means comprising:
means for capturing sets of raw data elements using the at least two sensors, wherein the raw data elements of the sets include coordinates of object detected by the respective detecting sensor and for each set of the coordinates associating a corresponding position of the respective detecting sensor;

means for forming a group of sets of the raw data elements from the sets of raw data elements captured by different sensors of the at least two sensors, where the sets of raw data elements in the group have a specific time association relative to one another;

means for performing object tracking for each set of the raw data elements in the group before transforming the coordinates contained therein; and means for transforming the coordinates contained in the sets of raw data elements into a common coordinate system for each set of the group, while taking account of the relative position of the detecting sensors.

18. An apparatus for the production of a model of a monitored zone (26) comprising at least two optoelectronic sensors (10, 12), in particular laser scanners, whose fields of view (22, 24) include the monitored zone;

a data processing device (20) designed to carry out the method in accordance with claim 1; and data links (16, 18) for the transfer of the raw data elements detected by the sensors (10) to the data processing device (20).

19. An apparatus for the production of a model of a monitored zone (26) comprising at least two optoelectronic sensors (10, 12), in particular laser scanners, whose fields of view (22, 24) include the monitored zone (26) and which each have an evaluation device for the object recognition and/or object tracking and for the output of corresponding virtual object data, a data processing device (20) designed to carry out the method in accordance with claim 1, and data links (16, 18) for the transmission of the raw data elements detected by the sensors (10, 12) and virtual object data to the data processing device (20).

20. The method in accordance with claim 1 characterized in that each sensor scans its filed of view.

\* \* \* \* \*